United States Patent [19]

Markham

[11] 4,264,081

[45] Apr. 28, 1981

[54] FIREPLACE IMPLEMENT BY WHICH FIREWOOD IS HAULED TO AND STORED JUXTAPOSED THE FIREPLACE

[76] Inventor: Donald A. Markham, 1449 Richards, Salt Lake City, Utah 84115

[21] Appl. No.: 95,044

[22] Filed: Nov. 16, 1979

Related U.S. Application Data

[63] Continuation-in-part of Ser. No. 848,256, Nov. 3, 1977, abandoned.

[51] Int. Cl.³ .............................................. B62B 3/10
[52] U.S. Cl. ................................. 280/5.24; 211/60 R; 280/47.34
[58] Field of Search ................. 280/47.2, 47.26, 47.24, 280/47.34, 47.17, 79.1 R, 79.1 A, 79.2, 79.3, 5.2, 5.24; 248/128, 129; 220/1 V; 211/49 R, 60 R; D12/25, 31

[56] References Cited

U.S. PATENT DOCUMENTS

| | | | |
|---|---|---|---|
| 1,576,325 | 3/1926 | Hopf | 280/79.3 X |
| 1,642,712 | 9/1927 | Angers | 280/5.24 |
| 2,311,422 | 2/1943 | Walling | 280/47.34 |
| 2,472,989 | 6/1949 | Skipper et al. | 280/46 |
| 2,896,961 | 7/1959 | Low | 280/47.26 |
| 3,021,011 | 2/1962 | Visneski | 280/79.1 A X |
| 3,371,795 | 3/1968 | Rosonke | 280/47.34 X |
| 3,920,260 | 11/1975 | Downing | 280/79.3 |

*Primary Examiner*—Randolph A. Reese
*Assistant Examiner*—Randall A. Schrecengost

*Attorney, Agent, or Firm*—Lynn G. Foster

[57] ABSTRACT

A fireplace implement for hauling and storing wood adjacent a fireplace comprising a cart having open sides, cradling fore and aft frames, handle members bridging between the top of fore and aft frames. The resulting assemblage is a vertically elongated cart which may be displaced in either direction parallel to four wheels which are floor or ground engaging when the cart is vertically erect and which accommodate support of the load on either set of two wheels when the cart is tilted for displacement across selected terrain, ground, floors and/or stairs, an curvilinear runner being provided adjacent each axle mounted idler wheel to assist in negotiating stairs. As a result, the cart provides ready access for loading and unloading at either open side of the cart and, when loaded, presents a relatively narrow vertical stack of firewood which may be retained in the cart, transported to a fireplace or like location and left stored out of the way though adjacent the fireplace for use from time to time. Displacement of the cart may be in either direction parallel to the wheels either in an erect or tilted posture. When the cart with wood therein is used in the storage mode, the cart is readily mobile for purposes of cleaning and the like. The bottom is open allowing debris to pass directly from the cart to the floor or ground below. The cart provides substantial advantages for the elderly and infirmed as it can be moved when loaded, partially loaded or empty without requiring the user to bend over or assert effort to any substantial extent.

4 Claims, 4 Drawing Figures

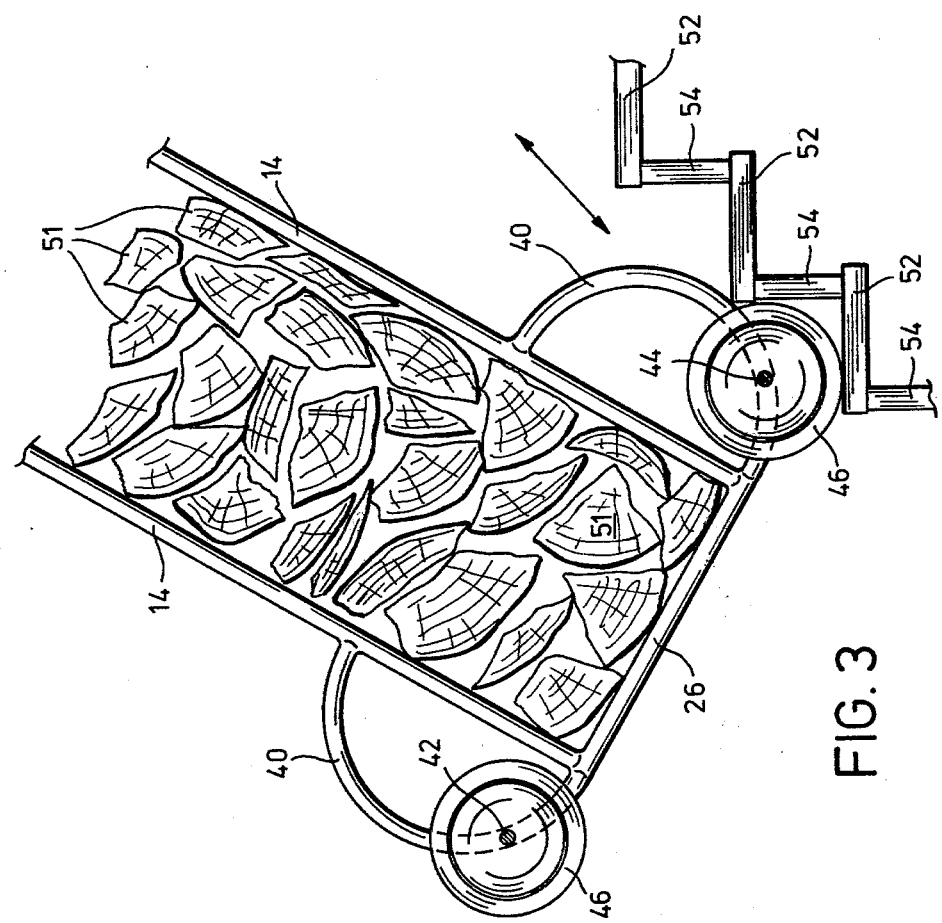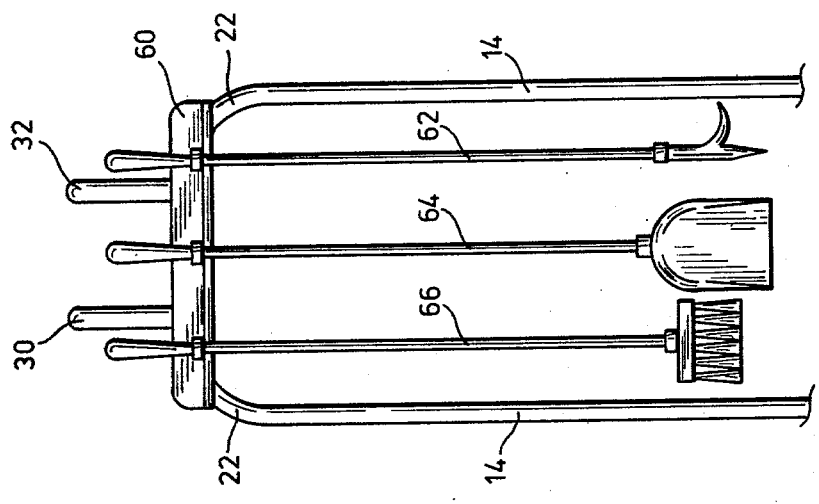

FIREPLACE IMPLEMENT BY WHICH FIREWOOD IS HAULED TO AND STORED JUXTAPOSED THE FIREPLACE

BACKGROUND

Continuity

This application is a continuation-in-part of my co-pending U.S. application Ser. No. 848,256, filed Nov. 3, 1977, now abandoned.

FIELD OF INVENTION

The present invention relates generally to manual handling of materials and more specifically to a system for hauling and storing firewood.

PRIOR ART

For a large number of yerars the elemental problem of hauling and storing pre-cut firewood for use in fireplaces and the like has posed laborious and time consuming problems to the typical homeowner. With recent increased shortages of the more commonly used natural gas and fuel oil sources of fuel, wood is becoming once more a more attractive source of heat energy for larger numbers of people. This is particularly true of the elderly and the infirmed who usually must operate within an extremely limited budget. Wood, to these categories of persons, constitutes, at the present time, a relatively inexpensive supplement to their heating needs. However, the loading, handling and storing of this source of energy has been extremely difficult if not physically impossible for such persons to pursue.

Commonly used manually manipulative mechanisms for transporting various inert objects do not conveniently, if at all, serve reasonably the needs of the average individual, much less the elderly and the infirmed, in bringing chopped wood from a source of supply into a residence or the like and to a position adjacent the indoor burning site for storage and progressive use. As an example, the typical wheel-mounted hand truck (one of which is disclosed in U.S. Pat. No. 2,472,989) cannot reasonably accommodate such displacement and, further, provides no such storage capacity.

Various utility carts earlier proposed for household and other purposes likewise have no reasonable and facile adaptability to the hauling and storage of wood.

It has been proposed (in U.S. Pat. No. 3,021,011) that a caster supported platform rack be provided for the hauling of relatively long lengths of logs which comprises not only a debris catching concave platform but opposed open top U-shaped cradle members each in a common plane with a U-shaped support member to which the casters are pivotally connected. While such a rack is mobile, it is cumbersome to use, particularly for the elderly and the infirmed and consumes an inordinate amount of space making storage of the rack during periods of non-use difficult. This type of rack does not reasonably accommodate displacement up and down stairs and does not create a vertically elongated stack of chopped wood for ultimate use.

See also the patents cited in the parent U.S. Patent Application.

BRIEF SUMMARY AND OBJECTS OF THE INVENTION

In summary, the present invention provides a fireplace implement comprising a unique cart, conveniently and facilely used by the elderly, the infirmed and others for both hauling and storing pre-cut firewood, the cart comprising a vertically elongated frame having open and unencumbered sides through which pieces of wood are thereafter readily loaded and unloaded. The frame comprises fore and aft vertical frame members secured to each other by cross members and having spaced elongated vertical posts respectively supported by floor or ground-engaging axle-mounted idler wheels which accommodate bi-directional erect or tilted displacement of the cart across the ground, the floor or along stairs when loaded, partially loaded or empty. When placed, with firewood therein, adjacent an indoor burning site, such as a stove or fireplace, little space is taken and placement out of the way, e.g. adjacent a wall, is readily achieved. The wood thus stored therein is directly accessible through either or both open sides and is used from time to time directly from the cart.

With the foregoing in mind it is a primary object of the present invention to provide a novel fireplace implement for both hauling and storing pre-cut wood for use within the home or the like.

Another paramount object is the provision of a unique cart for use by the infirmed, the elderly and others to haul and store pre-cut wood for use at an indoor buring site.

Another important object is the provision of a novel fireplace implement comprising firewood cart having an elongated vertical frame with open, unobstructed sides for facile loading and unloading of an elongated vertical column of pre-cut firewood.

A further significant object is the provision of an erect displaceable firewood hauling and storage cart which is tiltable fore and aft.

Another primary object is the provision of a firewood cart to haul and compactly store firewood adjacent to and for convenient use at an indoor burning site.

A further object is the provision of a novel firewood cart which readily accommodates loading and unloading of firewood and which is placed adjacent a fireplace, stove or the like with utensils and equipment carried thereon.

It is a further important object of the present invention to provide a novel firewood cart having one or more of the following features: an open bottom whereby debris is separated from the cart by gravity, top handle crosspieces, open sides with vertically elongated posts connected together both top and bottom, non-swivel wheels which easily negotiate stairs up and down either fore or aft of the cart.

These and other objects and features of the present invention will be apparent from the detailed description taken with reference to the accompanying drawings.

BRIEF DESCRIPTION OF THE DRAWINGS

FIG. 3 is a fragmentary side elevation view showing the cart of FIG. 1 loaded with firewood and tilted at an angle for the purpose of facilely negotiating stairs; and FIG. 4 is a fragmentary elevation view showing tools and equipment carried by the frame of a cart.

DETAILED DESCRIPTION OF THE ILLUSTRATED EMBODIMENT

Figure 1:
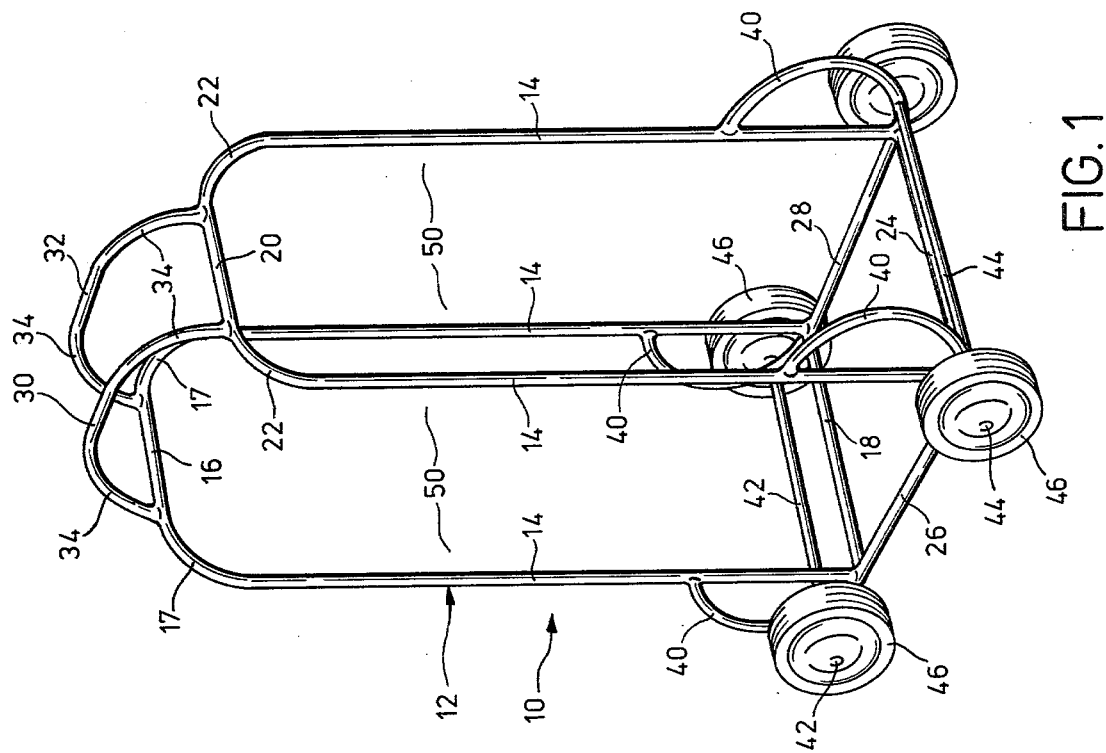
FIG. 1 is a perspective representation of a presently preferred firewood cart according to the present invention.

Reference is specifically made now to the drawings wherein like numerals are used to designate like part throughout. In particular, FIG. 1 illustrates a presently preferred firewood, hauling and storing cart, generally designated 10 and fabricated in accordance with the present invention. The cart 10 comprises a frame, generally designated 12, and preferably fabricated of hollow metal tubing. The frame 12 comprises four corner vertical posts 14 or columns, two of which are fore and two of which are aft. The two fore columns 14, are connected at the top by a crosspiece 16, which is rounded at 17, to curvilinearly join, e.g. by welding, said fore vertical posts. The two fore corner posts 14 are also connected immediately above the ground or floor by cross member 18, which is welded or otherwise suitably connected to the mentioned vertical posts. Fore posts 14, top crosspiece 16, corners 17 and bottom crosspiece 18 are in a common plane.

The two aft corner posts 14 are connected, e.g. by welding, at their elevated ends by crosspiece 20 so that the juncture therebetween presents rounded corners 22. Furthermore, immediately above the ground or floor the lower ends of the vertical posts 14 of the aft frame member are integrally joined by crosspiece 24 which is preferably welded in the illustrated position. Aft posts 14, top crosspiece 20, corners 22 and bottom crosspiece 24 are in a common plane parallel to but spaced from the plane containing fore posts 14.

The opposed fore and aft vertical posts 14 are respectively joined one to another immediately above the ground or floor by firewood stack support structure comprising beams or braces 26 and 28. The elevated crosspieces 16 and 20 are connected one to the other by two parallel, arcuately or curvilinearly shaped bars 30 and 32 attached just inward of the corners 17 and 22 of the crosspieces 16 and 20. The bars 30 and 32 are in effect handle bars to be gripped by the user and have rounded ends 34. Preferably the handle members 30 and 32 are welded at their respective ends to the crosspieces 16 and 20, although other forms of fastening could be utilized.

Toward the lower end of each post 14 is an integral arcuate or curved runner 40, sized and shaped to project outwardly and assist in displacement of the cart up and down the rungs 52 and vertical portion 54 of stairs in either a fore or aft direction and in the fashion as illustrated in and described in conjunction with FIG. 3. Preferably the runners 40 are integrally welded to the adjacent vertical post 14 and are essentially perpendicular to a plane containing the fore and aft posts 14, respectively.

In the manner illustrated in the Figures, fore and aft axles 42 and 44, respectively, are rigidly anchored to and pass through the two spaced runners 40, fore and aft. Idler wheels 46 are mounted on each end of each axle. The fore and aft sets of wheels 46 turn within a common plane and do not swivel thereby readily accommodating bi-directional displacement of the cart either in a fore or an aft direction and either vertically erect or tilted fore or aft.

Figure 2:
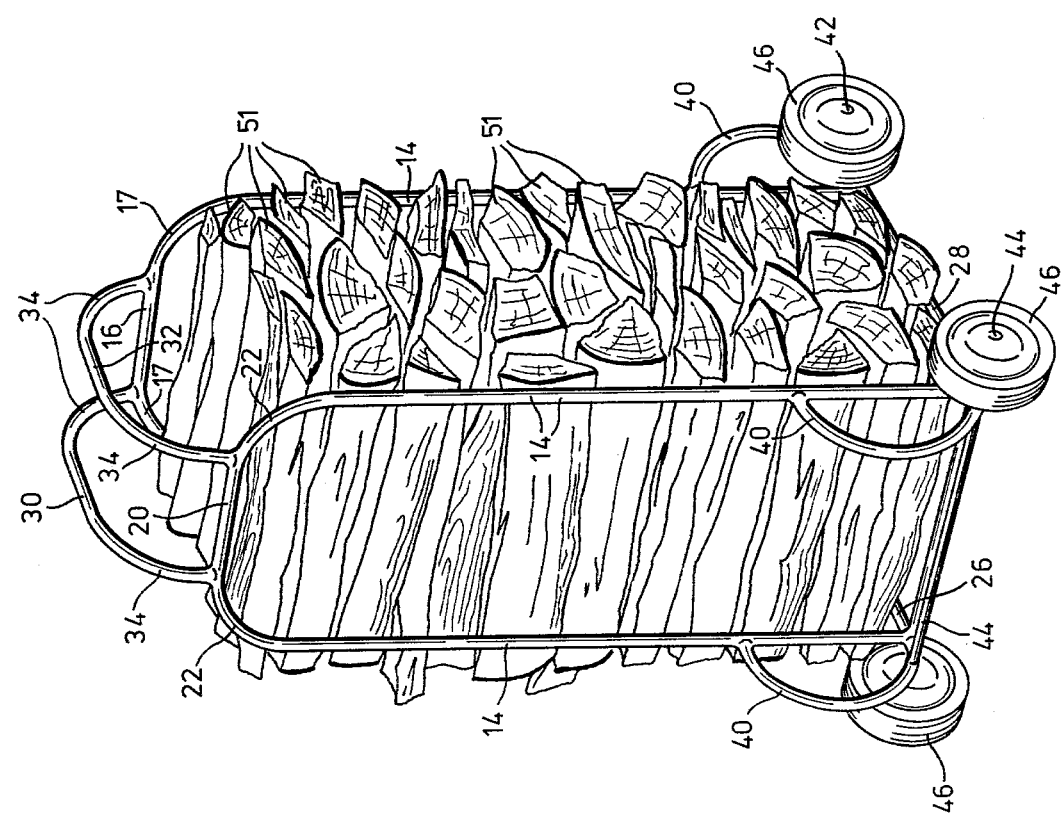
FIG. 2 is a perspective representation of the cart of FIG. 1 loaded with a vertical elongated stack of pre-cut firewood.

Thus, the empty cart may be readily displaced by the elderly, the infirmed or other persons down and upstairs, across floors and along the ground to a source of wood. The open sides 50 of the cart define a vertical elongated corridor therebetween. Thereafter, as illustrated in FIG. 2, ready placement of pre-cut pieces 5 of wood through one or both open sides 50 of the cart to form an elongated cradled vertical stack of firewood is accommodated.

Thereafter, the user, gripping handles 30 and 32 (and/or cross pieces 16 and 20) will typically tilt the cart either fore or aft and push or pull the tilted cart across the ground, floors and/or stairs from the source site toward a fireplace, stove or other indoor burning site. Erect displacement may also be achieved. Stairs are negotiated up or down in the general fashion as illustrated in FIG. 3, with the cart preferably tilted at an angle substantially similar to the angle of the stairs with the wheels 46 which engage the stair, the rungs 52 and the vertical portions 54. The pairs of runners 40 are used when and as needed.

The user is able to locate the loaded cart (FIG. 2) immediately adjacent a fireplace, stove or like burning site so that minimal space is taken. Ordinarily the space taken is immediately adjacent a wall so that the room in which the cart becomes disposed is not substantially encumbered by the presence of the cart. The cart remains mobile and may, therefore, be wheeled to and fro readily with minimal manual exertion for purposes of cleaning, etc. and thereafter returned to substantially the original position, if desired. Debris does not accumulate in the cart but rather falls from the cart through the open bottom onto the floor so that cleaning may be readily accomplished. The wood is progressively used from its cart storage location as the user desires with access for removal purposes being through one or the other of the two open sides 50 and requiring minimal physical exertion.

If desired, fireplace or like tools may be suspended from or otherwise carried by a bracket 60 (FIG. 4) which is welded, bolted or otherwise fastened to one of the crosspieces 16 and 20. The bracket 50 preferably contains recesses which accommodate reception of the stem of each tool but prevent passage therethrough of the handle flange of each tool so that the tools may be thereby suspended in the fashion generally shown in FIG. 4. The illustrated tools, not by way of restriction, comprise a poker 62, a shovel 64 and a brush 66.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fireplace implement for receiving, hauling and storing adjacent a fireplace a vertically elongated column comprising a horizontally directed array of aligned pieces of firewood, the fireplace implement comprising:
   a base frame comprising an open rectangular frame disposed in a horizontal plane, the frame comprising perimeter bar means integrally secured together in end-to-end relationship defining a bottom opening therebetween through which debris will fall;
   first and second front and rear open substantially vertically erect elongated rectangular frames disposed in spaced parallel vertical planes, the lower end of each side being integrally connected to and coextensive with the base, each front and rear frame comprising perimeter bar means comprising spaced vertically parallel elongated side bar means firmly connected at the lower ends thereof by said base and defining a substantial open area within the perimeter bar means, the transverse distance between the planes respectively containing the front and rear frames being less than one-half the vertical dimension of each front and rear frame and the transverse distance of each front and rear frame being less than one-half the vertical dimension of each front and rear frame;

the transverse region between the top and bottom of the two vertical front and rear frames;

bar connector means integrally bridging between and across the tops of the front and rear frames over the unobstructed transverse region, the base at the bottom and the bar connector means at the top being the sole interconnection between the two front and rear frames;

a set of fore and a set of aft axle mounted fixed alignment parallel ground engageable idler wheels carried directly adjacent the base frame for erect four wheel or inclined two wheel displacement of the implement at the option of the operator for loading of firewood at a storage site through the unobstructed area between the front the rear frames into the transverse region so as to solely rest upon the open base frame while being cradled solely between the front and rear frames, hauling of the firewood to a fireplace site using erect four wheel displacement or inclined two wheel displacement and erect storage of the firewood in the implement juxtaposed the fireplace for ready firewood access through the transverse regions.

2. A fireplace implement according to claim 1 further comprising curvilinear runners adjacent and outwardly parallel beyond each wheel to aid in inclined displacement of the fireplace implement up and down stairs.

3. A fireplace implement according to claim 1 wherein the bar connector means comprise two curvilinear bars.

4. A fireplace implement according to claim 1 further comprising means by which manual fire tools are releasably carried by the fireplace implement for ready use availability adjacent the fireplace.

* * * * *